United States Patent Office 3,444,453
Patented May 13, 1969

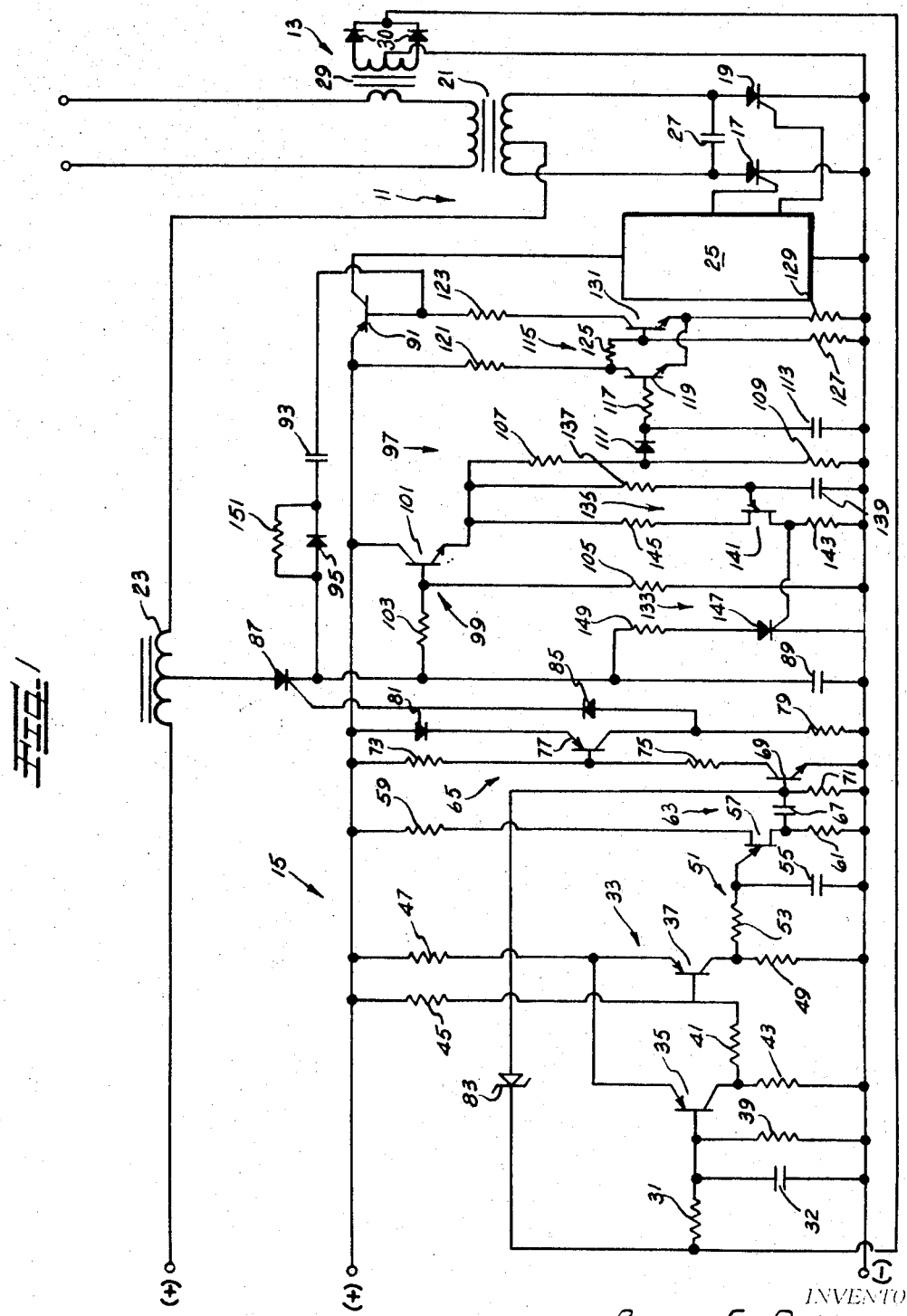

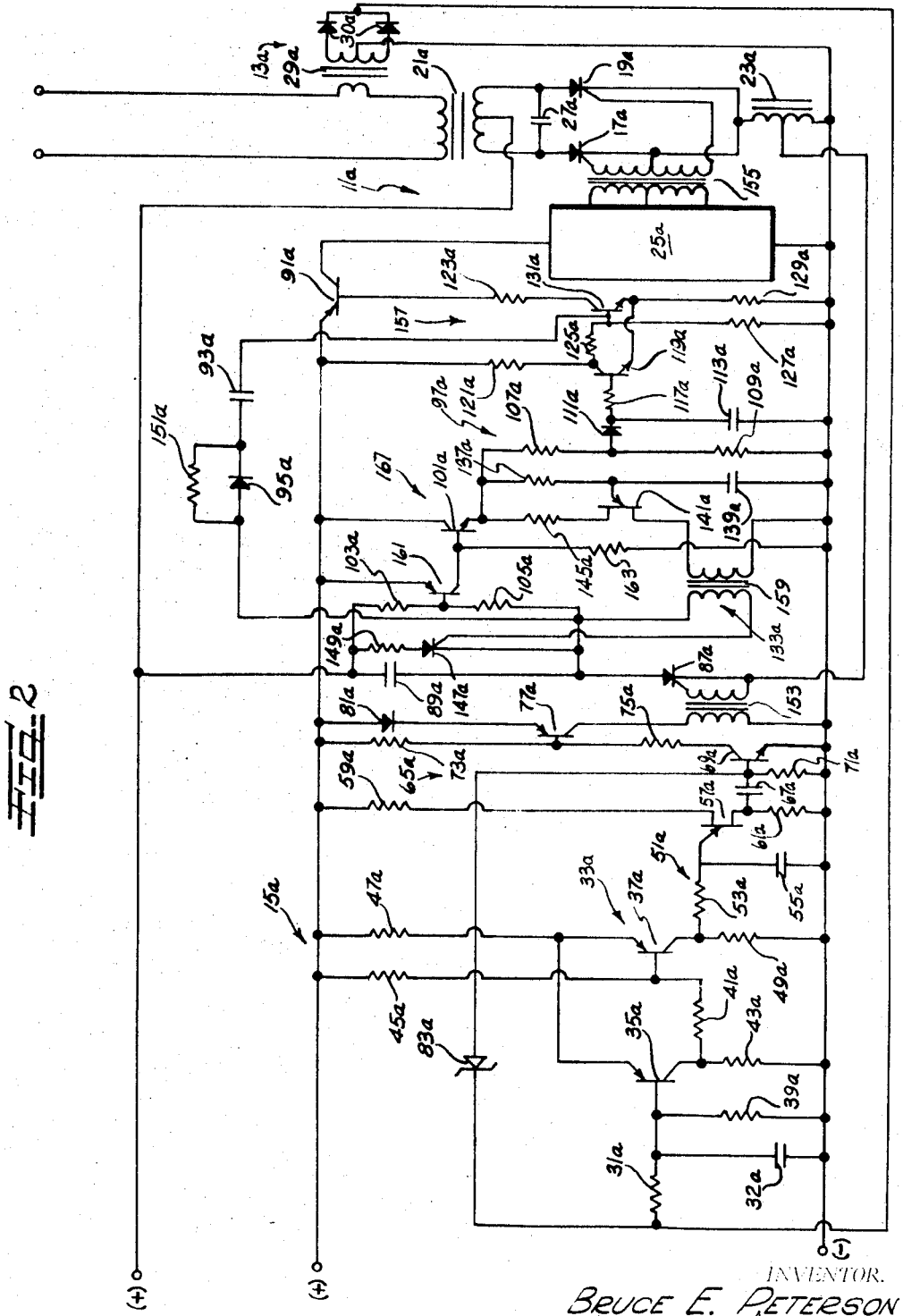

3,444,453
CIRCUIT FOR CONTROLLING THE OPERATION OF A STATIC INVERTER UNDER OVERLOAD CONDITIONS
Bruce E. Peterson, Northbrook, Ill., assignor to Vapor Corporation, Chicago, Ill., a corporation of Delaware
Filed July 13, 1966, Ser. No. 564,870
Int. Cl. H02m 1/18; H02h 7/12
U.S. Cl. 321—11                                    6 Claims

ABSTRACT OF THE DISCLOSURE

A control circuit is provided for a static inverter which interrupts the operation of a static inverter under overload conditions. During periods of operation when the load current is within normal operating limits, the control circuit is inoperative. In the event of a slight overload having a short time duration, the control circuit fails to de-energize the inverter. However, should the overload condition persist, the inverter operation is interrupted. During periods of excessive overload, i.e., short circuit conditions, the inverter operation is immediately interrupted thereby eliminating any possibility of component damage. After the inverter is de-energized, the control circuit, after a short time period, automatically resets and the inverter becomes operative, and should the overload condition persist, the control circuit recycles.

---

This invention generally relates to a control circuit for a static inverter and more particularly relates to a control circuit which turns off a static inverter in response to the presence of an overload condition, thus preventing component damage.

Present day static inverters, which function to convert direct into alternating current, are normally constructed of solid state devices. In the event of circuit overload, various inverter components may be permanently damaged. To protect the inverter from the damaging effects of overload conditions, circuit breakers of various types have been generally employed. Such breakers are usually electromechanical and include a relay, the coil of which is actuated by the current flowing to the inverter load. Excessive current flow through the relay coil causes the load circuit to open after which the relay is manually reset. Such electromechanical devices generally exhibit an inherent time delay before the load circuit is opened in response to the overload condition. While under slight overload conditions this time delay may not be objectionable, its presence in the event of an extreme overload, such as a short circuit, may result in damage to inverter components before the circuit breaker has sufficient time to function.

A particularly desirable device would be one which is capable of distinguishing between slight overloads and extreme overloads, and in the former situation including means for delaying circuit interruption until the overload condition continues for a given period of time. In the event of an extreme overload, the load circuit should instantaneously be interrupted.

An object of the present invention is to provide an overload control circuit for a static inverter. A further object is to provide a control circuit having the ability to distinguish between slight overload conditions and extreme overload conditions. It is a further object to provide an inverter control circuit having an inherent time delay so that transient minor overload conditions do not interrupt operation of the inverter. It is still a further object to provide an overload device for a static inverter which includes means for automatically resetting the device after the lapse of a fixed time period and for recycling the control device in the event the overload condition persists.

Other objects and advantages of the present invention will become apparent through reference to the following description and accompanying drawings, which show an illustrative embodiment of this invention, wherein:

FIGURE 1 is a schematic diagram of a static inverter including an overload control device in accordance with this invention;

FIGURE 2 is another embodiment of the control device of FIGURE 1 in accordance with this invention.

The embodiment illustrated in FIGURE 1 comprises a static inverter 11 delivering alternating curernt to a suitable load (not shown). A means 13 is provided for sensing the current flow to the load, and the signal output therefrom is fed into a control circuit 15 which interrupts the operation of the static inverter 11 in the event of an overload condition. During periods of operation when the load current is within normal operating limits the control circuit 15 is inoperative. In the event of a slight overload having a short time duration, the control circuit 15 fails to de-energize the inverter 11; however, should the overload condition persist, the inverter operation is interrupted. During periods of excessive overload i.e. short circuit conditions the inverter operation is immediately interrupted thereby eliminating any possibility of component damage. After the inverter is de-energized, the control circuit 15, after a short time period, automatically resets and the inverter 11 becomes operative, and should the overload condition persist, the control circuit 15 recycles.

More particularly, as shown in FIGURE 1, the inverter 11 comprises a pair of switching means 17 and 19 each of which is a silicon controlled rectifier. The anodes of the controlled rectifiers 17 and 19 (hereinafter referred to as inverter rectifiers) are connected across the primary terminals of an output transformer 21 and the cathodes of the inverter rectifiers are connected to the negative side of a direct current power source (not shown). The center tap of the primary of the transformer 21 is connected to the positive side of the direct current source through a center tapped inductor 23.

The inverter rectifiers 17 and 19 are alternately switched on by means of an oscillator and square wave gate drive circuit 25 the construction of which is well known to those skilled in the art. During conduction of one of the inverter rectifiers, the remaining rectifier is turned off by a commutating capacitor 27 connected across the primary of the transformer 21. The gate drive circuit 25 alternately triggers on the gates of the inverter rectifiers 17 and 19, and the rectifiers are turned off by a reverse bias voltage instantaneously applied to the anode of the formerly conducting rectifier by the commutating capacitor 27. Thus, a direct current is caused to flow alternately through each half of the primary of the transformer 21.

The current flowing to the load of the inverter is sensed by the sensing means 13 comprising a current transformer 29 the primary of which is connected in series with the load. The secondary of the current transformer 29 is coupled to a full wave rectifier circuit including diode 30 and the center tap thereof is connected to the negative side of the direct current source. A positive voltage is thus provided at the output of the current sensing means 13 which is proportional to the current flowing to the load.

The positive voltage derived from the current sensing means 13 is coupled through an L-type, resistor 31 and capacitor 32 filter circuit to the input of a voltage level detecting means 33 which, in the illustrated embodiment, is a conventional Schmitt trigger circuit. The Schmitt trigger circuit includes a pair of PNP transistors 35 and 37, and bias resistors 39 through 49. The operation of the Schmitt trigger circuit is such that the output transistor 37 thereof remains non-conducting until the input signal to the base of the input transistor 35 exceeds a predetermined value. Under normal operation of the control circuit, the input signal from the current sensing means is insufficient to cause the output transistor 37 to become conductive; however, when the load current exceeds a predetermined value, the positive signal from the current sensing means causes the output transistor 37 to become conductive thereby providing an increased current flow through its collector resistor.

The output signal of the Schmitt trigger circuit, which signal is developed across the collector resistor 49, is coupled to a time delay circuit 51. The illustrated time delay circuit includes a series resistor 53 and capacitor 55 connected across the collector resistor 49 and a unijunction transistor 57, the emitter of which is connected to the junction of the resistor and the capacitor. After a short period of time the charge upon capacitor 55 reaches a sufficient value to cause the unijunction transistor 57 to conduct producing a voltage drop across its base resistors 59 and 61. Thus, in the event of an instantaneous transient overload condition, the Schmitt trigger circuit 33 switches; however, due to the time delay produced by the series resistor 53 and the capacitor 55, the signal applied to the emitter of the unijunction is not sufficient to cause the unijunction transistor 57 to conduct. However, should the overload condition persist, the capacitor charges sufficiently after a short period of time to cause the unijunction transistor 57 to conduct and provide a pulse at its base. This pulse is employed to interrupt the operation of the inverter rectifiers 17 and 19 in a manner to be hereinafter more clearly described.

The signal pulse developed across the base resistor when the unijunction conducts, is amplified by a pair of direct coupled transistor amplifiers 63 and 65. Specifically, the base of the unijunction transistor 57 is coupled through a capacitor 67 to the base of an NPN transistor 69 connected in a common emitter configuration and having an associated base resistor 71 and series connected collector resistors 73 and 75. The junction between the series connected collector resistors 73 and 75 is coupled to the base of a PNP transistor 77 connected in a common emitter configuration which provides an amplified pulse across its collector resistor 79. A diode 81 is connected in series with the emitter of the transistor 77 to provide temperature compensation for the amplifier 65.

In the illustrated embodiment, means 83 is provided for bypassing the time delay circuit 51 in the event a short circuit is present in the load. The bypassing means 83 is a Zener diode connected between the output of the sensing means 13 and the base of the first transistor 69 of the pair of transistor amplifiers. The breakdown voltage of the Zener diode 83 is selected so that in the event of an excessively high current flowing to the load, the Zener diode 83 breaks down. Thus, under short circuit conditions, the Schmitt trigger circuit 33 and the unijunction transistor 57 and its associated time delay means 51 is bypassed to instantaneously provide a signal at the input of the amplifying transistors 69 and 77.

As shown in FIGURE 1, the signal at the collector of the second amplifying transistor 77 is applied through a steering diode 85 to the gate of a silicon controlled rectifier 87 (hereinafter referred to as the turnoff rectifier). The anode of the turnoff rectifier 87 is connected to the center tap of the inductor 23. The pulse applied to the gate of the turnoff rectifier 87 causes it to abruptly conduct thereby coupling the center connection of the series inductor to a reset capacitor 89 connected to the cathode of the turnoff rectifier. The reset capacitor 89 is in an uncharged condition and hence a high current initially flows through the turnoff rectifier 87 and one half of the inductor 23.

By transformer action a negative pulse is induced in the other half of the inductor 23, which pulse is applied to the anodes of the inverter rectifiers 17 and 19, thereby rendering the conducting inverter rectifier nonconductive.

Simultaneously, with the turnoff of the inverter rectifiers 17 and 19, the gate drive means 25 is de-energized. In this connection, a voltage regulating transistor 91, the emitter-collector circuit of which is connected in series with the positive voltage applied to the gate drive means 25, is instantaneously rendered non-conductive, thereby interrupting power to the gate drive means 25. The voltage regulating transistor is rendered non-conductive by the charging of a capacitor 93 connected to the base of the voltage regulating transistor. The capacitor 93 is charged when the turnoff rectifier 87 is rendered conductive. Specifically, the capacitor 93 is coupled to the cathode of the turnoff rectifier via a diode 95.

The voltage regulating transistor 91 and hence the gate drive means 25, is maintained in a nonconductive state for a predetermined time interval by a holding circuit 97 which includes a transistor emitter-follower 99 for impedance matching the voltage developed across the low impedance reset capacitor 89 to the holding circuit 97. The transistor emitter-follower 99 includes an NPN transistor 101 connected in a common collector configuration. The base of the transistor is coupled to the junction of a pair of resistors 103 and 105 connected in parallel with the reset capacitor 89. The collector of the transistor 101 is connected to the positive voltage supply and the emitter is coupled through a pair of series connected resistors 107 and 109 to the negative power supply. The signal at the junction of the series resistors 107 and 109 is coupled through a steering diode 111 to a holding capacitor 113, thereby charging the capacitor.

When the voltage across the holding capacitor 113 reaches a predetermined level, a Schmitt trigger circuit 115 switches to thereby keep the voltage regulating transistor 91 biased to a non-conductive state. Specifically, the junction between the steering diode 111 and the holding capacitor 113 is connected through a resistor 117 to the base of an input NPN transistor 119 comprising a portion of the Schmitt trigger circuit 115. The Schmitt trigger circuit further includes biasing resistors 121 through 129, and an output NPN transistor 131. The conduction of the output transistor 131 keeps the voltage regulating transistor 91 biased off thereby maintaining the interruption in the voltage supplied to the gate drive means 25 until the voltage on the capacitor 113 is reduced below the switching level to the Schmitt trigger circuit.

The output of the coupling transistor 101 is also applied to a resetting circuit 133 which permits the gate drive means 25 to be energized after a predetermined time interval. The illustrated resetting circuit 133 includes time delay means 135 comprised of a resistor 137 and a series capacitor 139 connected to the emitter of the coupling transistor 101. The junction between the capacitor 139 and the resistor 137 is connected to the emitter of a unijunction transistor 141. Conduction of the unijunction transistor 141 causes current to flow through its base resistors 143 and 145. The voltage developed across base resistor 143 is applied to a gate of a controlled rectifier 147 (hereinafter referred to as the reset rectifier) the anode-cathode circuit of which is connected in series with a resistor 149. The serially connected resistor 149 and anode-cathode circuit of the reset rectifier 147 are connected in parallel with the reset capacitor 89.

Conduction of the reset rectifier 147 discharges the capacitor 89 through series resistor 149 and the capacitor 93 through a bypass resistor 151 which is coupled in parallel with the diode 95. The series resistors 103 and 105 are made sufficiently large that the reset capacitor does not discharge until the reset circuit operates. The turnoff rectifier 87 has already been turned off by the reduction in its holding current when the reset capacitor 89 reached its charged condition. Likewise, the reset rectifier 147 turns off after the capacitors 89 and 93 discharge.

Voltage is thus removed from the holding capacitor 113 and it likewise discharges through the input transistor 119 of the Schmitt trigger circuit. When the voltage across the holding capacitor reaches a value below the switching level of the Schmitt trigger circuit, the Schmitt trigger circuit 115 switches thereby permitting voltage to be applied to the gate drive means 25. The inverter thus resumes operation.

Referring to FIGURE 2, another embodiment of the control device is shown wherein components which are similar to the components of the previously described embodiment are designated by the same reference numeral with the subscript a. This control device is similar to FIGURE 1 except that a different circuit is employed to turn off the inverter rectifiers 17a and 19a.

As shown in FIGURE 2, the primary of a pulse transformer 153 is connected in series with the collector of the output amplifying transistor 77a. A current pulse is thus developed across the secondary of the pulse transformer. When the unijunction fires or when the Zener diode 83a breaks down, this pulse is applied to the gate of the turnoff rectifier 87a. More specifically, one side of the secondary winding is connected to the gate and the other side is connected both to the cathode of the turnoff rectifier and to the center tap of the inductor 23a. The inductor, in turn, is connected between the cathodes of the inverter rectifiers and the negative supply. The anode of the turnoff rectifier 87a is connected to the reset capacitor 89a.

Conduction of the turnoff rectifier 87a causes the conducting inverter rectifier to be instantaneously turned off. In this connection, when the turnoff rectifier 87a conducts, a high current pulse flows through one half of the inductor 23a, thereby causing a positive pulse to be applied to the cathodes of the inverter rectifiers 17a and 19a. This positive pulse turns off the conducting inverter rectifier thus interrupting the flow of direct current through the primary winding of transformer 21a.

The current flowing through the turnoff rectifier 87a also permits the capacitor 89a, which is connected to the anode of the controlled rectifier, to charge thereby applying a negative pulse through the rectifier 95a and capacitor 93a to the base of the output transistor 131a of the Schmitt trigger circuit 157. This pulse causes transistor 131a to cease conduction turning off the voltage regulating transistor 91a thereby interrupting power to the gate drive means 25a. The output of the gate drive means is coupled to the respective gates of the inverter rectifiers by means of a transformer 155. Hence, the gates have no voltage applied thereto when the gate drive means is de-energized.

The holding circuit 97a and resetting circuit 133a is similar to that described above in connection with FIGURE 1 except that, because of the opposite polarity of voltage developed across the reset capacitor 89a, an additional transistor amplifier 167 is provided. Also, since one side of the reset capacitor 89a is not connected to the negative terminal as in FIGURE 1, a pulse transformer 159 is employed to couple the output pulse of the unijunction transistor 141a to the gate of the reset rectifier 147a. The additional transistor amplifier is comprised of a PNP transistor 161 coupled in a common emitter configuration. The base of the transistor is connected to the resistors 105a and 103a and its collector is connected to the base of the coupling transistor 101a. A bias resistor 163 is connected between the collector and the negative supply. The pulse transformer 159 has its primary connected in series with one base of the unijunction transistor 141a and its secondary connected to the gate of the silicon controlled rectifier 147a.

As can be seen from the above, a control device for a static inverter has been provided which will distinguish between normal, short circuit and slight overload conditions. Further, the apparatus is provided with automatic reset means and in the event the overload condition persists, the control circuit will automatically recycle.

Various changes and modifications can be made in the above described control device without departing from the spirit and scope of this invention.

I claim:

1. In a static inverter, an overload control circuit for interrupting the operation of the static inverter in the event of an overload condition, which inverter includes a plurality of switching means for switching the direct current power applied to said inverter, and a first control means connected to said switching means for controlling the conduction of said switching means in a predetermined sequence, said control circuit comprising a current sensing means providing an output voltage corresponding to the current flowing from said inverter, a second control means having its output coupled to said switching means and responsive to the output voltage of said current sensing means when the load current exceeds a first predetermined value, said second control means, when actuated, interrupting the operation of said switching means and including a time delay means for preventing the actuation of said second control means unless the load current exceeds said first predetermined value for a fixed period of time, means coupled to said second control means for automatically resetting said second control means after the lapse of a predetermined time interval so as to reinitiate operation of said switching means, and bypass means responsive to the output voltage of said current sensing means when the load circuit exceeds a second predetermined value which is higher than said first predetermined value, said bypass means bypassing said time delay means so as to permit instantaneous interruption of the operation of the switching means in the event of a load current in excess of said second predetermined value.

2. An apparatus in accordance with claim 1 wherein each switching means is a first controlled rectifier, the gate of which is controlled by said first control means and wherein said second control means includes a second controlled rectifier which provides a turnoff pulse to one of the electrodes of each of said first controlled rectifiers in response to the output voltage of said current sensing means when the load current exceeds the first predetermined value for the fixed period of time so as to instantaneously interrupt operation of said inverter, and wherein said second control means further includes means coupled to said first control means for deactuating said first control means in response to the voltage output of said current sensing means when the load circuit exceeds the first predetermined value for the fixed period of time.

3. An apparatus in accordance with claim 2 wherein said deactuating means includes second time delay means for holding said first control means in its de-energized condition for said predetermined time interval.

4. An apparatus in accordance with claim 3 wherein said second control means includes means for resetting said second controlled rectifier prior to energization of said first control means.

5. An apparatus in accordance with claim 1 wherein each switching means is a first controlled rectifier, the gate of which is controlled by said first control means, wherein said second control means includes a tapped inductance coupled to one side of said direct current power source and to either one of the anode and the cathode of said first controlled rectifiers and further includes a second controlled rectifier having its anode-cathode circuit coupled between the tap of said inductance and the other side of said direct current power source, said second controlled rectifier being rendered conductive in response to the output voltage of said current sensing means when the load current exceeds said first predetermined value for said fixed period of time so as to thereby provide a turnoff pulse to said anode or said cathode of said first controlled rectifiers to interrupt operation of said inverter, and wherein said second control means further includes means coupled to said first control means for deactuating said first control means in response to the voltage output of said current sensing means when the load current exceeds said first predetermined value for said fixed period of time.

6. An apparatus in accordance with claim 5 wherein a reset capacitor is coupled between the anode-cathode circuit of said second controlled rectifier and said other side of said direct current power source, wherein said deactuating means includes means for interrupting power to said first control means in response to a pulse applied thereto, a capacitor coupled to said power interrupting means and to said junction between said reset capacitor and said anode-cathode circuit of said second controlled rectifier whereby said first control means is de-energized when said second control rectifier is rendered conductive, and a second time delay means responsive to the voltage developed across said reset capacitor for holding said first control means in its de-energized condition for a time interval after said capacitor is discharged, and a third controlled rectifier coupled to said reset capacitor so as to discharge said capacitor.

References Cited
UNITED STATES PATENTS

| | | | |
|---|---|---|---|
| 3,388,310 | 6/1968 | Etter | 321—5 |
| 3,392,321 | 7/1968 | Giannamore et al. | 321—11 |

JOHN F. COUCH, *Primary Examiner.*

W. H. BEHA, JR., *Assistant Examiner.*

U.S. Cl. X.R.

317—33